(12) United States Patent
Sinreich

(10) Patent No.: US 8,280,317 B2
(45) Date of Patent: Oct. 2, 2012

(54) PASS-THROUGH CONNECTION SYSTEMS AND METHODS FOR PROCESS CONTROL FIELD DEVICES

(76) Inventor: Mark Sinreich, Twinsburg, OH (US)

( * ) Notice: Subject to any disclaimer, the term of this patent is extended or adjusted under 35 U.S.C. 154(b) by 1043 days.

(21) Appl. No.: 12/147,454

(22) Filed: Jun. 26, 2008

(65) Prior Publication Data

US 2009/0081957 A1   Mar. 26, 2009

Related U.S. Application Data

(60) Provisional application No. 60/937,396, filed on Jun. 26, 2007, provisional application No. 60/937,397, filed on Jun. 26, 2007.

(51) Int. Cl.
*H04B 1/38* (2006.01)
(52) U.S. Cl. .............. 455/90.3; 455/90.1; 340/539.17; 340/539.1
(58) Field of Classification Search .............. 455/90.1, 455/90.3, 66.1; 340/539.1, 539.17; 700/19, 700/22
See application file for complete search history.

(56) References Cited

U.S. PATENT DOCUMENTS

2005/0245291 A1*  11/2005  Brown et al. ................. 455/572
2009/0146502 A1*   6/2009  Sinreich ....................... 307/104

* cited by examiner

*Primary Examiner* — Lewis West
(74) *Attorney, Agent, or Firm* — Ulmer & Berne, LLP

(57) ABSTRACT

Systems and methods are provided to connect wireless adapters and field devices for process control systems, such systems and methods include a process control system having a field device, a wireless adapter, a first wire and a second wire. The field device includes a first terminal, a second terminal, a first conduit and a second conduit. The wireless adapter includes a first terminal, a second terminal, a first port and a second port. The first conduit of the field device couples to the second port of the wireless adapter. The first wire passes between the field device and the wireless adapter connecting the first terminal of the field device to the first terminal of the wireless adapter. The second wire passes between the field device and the wireless adapter connecting the second terminal of the field device to the second terminal of the wireless adapter. Other systems and methods are also provided.

11 Claims, 3 Drawing Sheets

PASS-THROUGH CONNECTION SYSTEMS AND METHODS FOR PROCESS CONTROL FIELD DEVICES

REFERENCE TO RELATED APPLICATIONS

The present application claims priority of U.S. Provisional Application Ser. No. 60/937,396, filed Jun. 26, 2007, and U.S. Provisional Application Ser. No. 60/937,397, filed Jun. 26, 2007, the entire disclosures of which are hereby incorporated herein by reference.

TECHNICAL FIELD

The systems and methods disclosed relate generally to the field of process control systems. More specifically, the disclosed systems and methods relate to wireless adapters in connection with field devices for process control systems.

BACKGROUND

Conventional process control systems generally include components for sensing, measuring, evaluating, and adjusting or otherwise controlling a variety of process variables. Such systems also generally include components that provide the capability to communicate information about process control variables between sensing, measuring, evaluating or adjusting components. One such system for communicating information is a two-wire system that creates a loop that physically connects a sensing, measuring, evaluating or adjusting device (e.g., field device) to a process controller. However, while such conventional systems and methods provide techniques for sensing, measuring, evaluating, adjusting and/or otherwise controlling a variety of process variables, these systems and methods have not provided arrangements of tying field devices within a control system with wireless capabilities.

SUMMARY

In accordance with one embodiment, a process control system comprises a field device, a wireless adapter, a first wire and a second wire. The field device comprises a first terminal, a second terminal, a first conduit and a second conduit. The wireless adapter comprises a first terminal, a second terminal, a first port and a second port. The first conduit of the field device couples to the second port of the wireless adapter. The first wire passes between the field device and the wireless adapter connecting the first terminal of the field device to the first terminal of the wireless adapter. The second wire passes between the field device and the wireless adapter connecting the second terminal of the field device to the second terminal of the wireless adapter.

In accordance with another embodiment, a process control system comprises a field device, a wireless adapter, a first wire, a second wire and a process controller. The field device comprises a first terminal, a second terminal, a first conduit and a second conduit. The wireless adapter comprises a first terminal, a second terminal, a first port and a second port. The first conduit of the field device couples to the second port of the wireless adapter such that the wireless adapter is located at a position downstream from the field device. The first wire passes between the wireless adapter and the field device connecting the first terminal of the wireless adapter to the first terminal of the field device. The second wire passes between the wireless adapter and the field device connecting the second terminal of the wireless adapter to the second terminal of the field device. The process controller is located at a position upstream from the field device.

In accordance with yet another embodiment, a process control system comprises a field device, a wireless adapter, a first wire, a second wire, a third wire and a process controller. The field device comprises a first terminal, a second terminal, a first conduit and a second conduit. The wireless adapter comprises a first terminal, a second terminal, a third terminal, a fourth terminal, a first port and a second port. The second conduit of the field device couples to the first port of the wireless adapter such that the wireless adapter is located at a position upstream from the field device. The first wire passes between the field device and the wireless adapter connecting the first terminal of the field device to the first terminal of the wireless adapter. The second wire passes between the field device and the wireless adapter connecting the second terminal of the field device to the second terminal of the wireless adapter. The process controller is located at a position upstream from the field device. The third wire is connected to the third terminal of the wireless adapter and configured to pass to the process controller.

In accordance with still another embodiment, a method of connecting a wireless adapter inline on a process control system comprises attaching a wireless adaptor to a field device. The wireless adapter comprises a first terminal, a second terminal, a first conduit and a second conduit. The field device comprises a first terminal, a second terminal, a first conduit and a second conduit. The method also includes passing a first wire between the field device and the wireless adapter connecting the first terminal of the field device to the first terminal of the wireless adapter. Finally, the method includes passing a second wire passing between the field device and the wireless adapter connecting the second terminal of the field device to the second terminal of the wireless adapter.

BRIEF DESCRIPTION OF THE DRAWINGS

While the specification concludes with claims particularly pointing out and distinctly claiming the invention, it is believed that the same will be better understood from the following description taken in conjunction with the accompanying in which:

DETAILED DESCRIPTION

Figure 1:
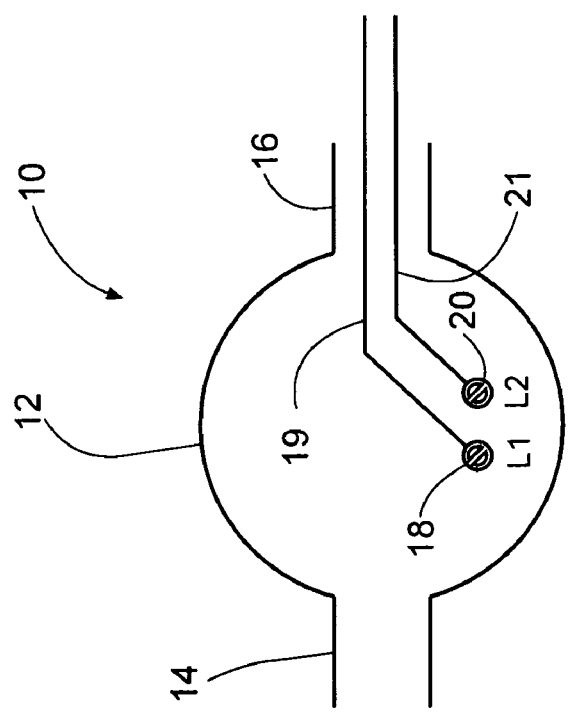
FIG. 1 illustrates a block diagram of a field device within a process control system.
Figure 2:
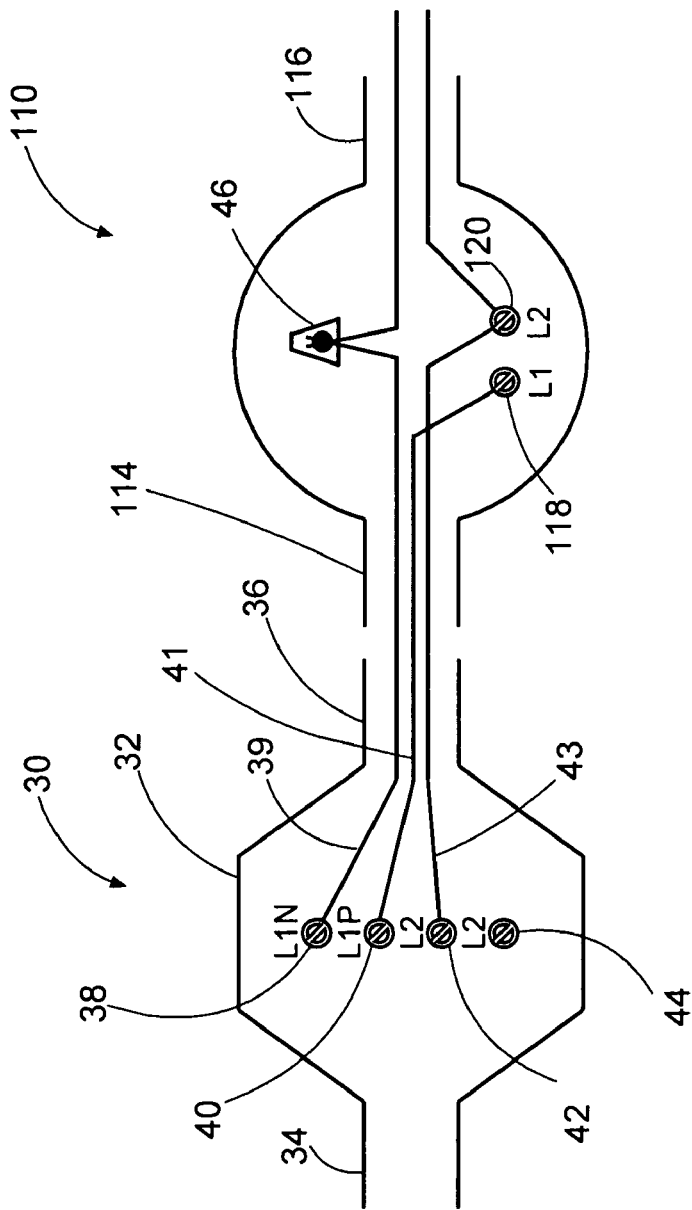
FIG. 2 illustrates a block diagram of a field device in combination with a wireless adapter within a process control system.

Embodiments are herein described in detail in connection with the drawings of FIGS. 1-3, wherein like numbers indicate the same or corresponding elements throughout the drawings.

Sensing, measuring, evaluating, and/or adjusting devices in industrial production environments are generally referred to as field devices. A field device 10 is generally illustrated by the block diagram illustrated in FIG. 1. Field devices commonly sense or monitor one or more process control variables, such as temperature, pressure, and/or rate of flow, among others. Many of these field devices can communicate information about the sensed or monitored variable(s) to a controller (e.g., programmable logic controller, general purpose computer, etc.) by regulating electrical current on a two-wire system. A controller in this type of environment can sense changes in electrical current such as by using a current sense resistor, and translate the sensed change into information about the sensed or monitored control variable. Many conventional field devices can receive information from a control system and effect changes or adjustments to a control variable being monitored.

Two methods of communicating information using a two-wire loop system can include analog and digital signaling systems. Such analog signaling systems can include, for example, those systems that regulate electrical voltage. Digital signaling systems can include such systems that can transmit and receive data as a frequency shift keyed carrier signal that can be superimposed on, and coexist with, an analog signal, for example those analog signals associated with a system having a two-wire loop. One digital signaling system is the Highway Addressable Remote Transducer ("HART") communications protocol from the HART® Communication Foundation. As referred to herein, HART refers to any past or present version of the HART protocol, including Wireless HART, variants of such versions, as well as any future version that may be created so long as those future versions are compatible or can be modified to be compatible with the systems and methods disclosed herein.

As noted above, FIG. 1 illustrates a field device 10. This field device 10 can include a casing 12 having two conduits (e.g., a first conduit 14 and a second conduit 16). Within the casing 12 of the field device 10, a first terminal 18 and a second terminal 20 (i.e., shown as L1 and L2 respectively in FIG. 1) can reside. The first terminal 18 and the second terminal 20 can include screw terminal block connections. It will be appreciated that other types of connections can be used for such terminals. Extending from the first terminal 18 can be a first wire 19. Extending from the second terminal 20 can be a second wire 21. The first wire 19 and the second wire 21 can pass through an opening in the second conduit 16 of the field device 10 to connect to a controller (not shown). As illustrated in FIG. 1, the first conduit 14 of the field device 10 can be unused.

In order to allow a field device to sense, measure, evaluate, and/or adjust in a wireless environment, a wireless adapter can be placed in-line within a process control system. As illustrated in the embodiment shown in FIG. 2, a wireless adapter 30 can be connected to a field device 110. The wireless adapter 30 can allow the field device 110 to wirelessly operate and communicate within a process control system. For examples the field device 110 could communicate with a radio frequency based network in a facility, such that the wireless adapter 30 can function as a gateway between components that can provide digital signaling for the field device, 110 and a wireless communication network in a facility. The wireless adapter 30 can include a casing 32 having a first port 34 and a second port 36. The wireless adapter 30 can have a plurality of terminals (e.g., items 38, 40, 42 and 44 in FIG. 2) having a plurality of wires (e.g., items 39, 41 and 43 in FIG. 2) extending from the respective terminals. As shown the embodiment of FIG. 2, the second port 36 of the wireless adapter 30 can couple to a first conduit 114 of the field device 110. It will be appreciated that various types of coupling connections could be employed and can include, for example, a substantially air-tight connection in order to prevent any potential interference of the signals being sensed or monitored by a field device. As illustrated in FIG. 2, the wireless adapter 30 can be downstream of the field device 110.

The plurality of wires (e.g., items 39, 41 and 43 in FIG. 2) attached at respective terminals (e.g., items 38, 40 and 42) within the wireless adapter 30 pass through the coupled attachment and into the field device 110. As shown in FIG. 2, two of the wires (e.g., items 41 and 43) attach to the first terminal 118 and the second terminal 120, respectively, which are within the field device 110. Wire 43 continues on from the second terminal 120 and passes through a second conduit 116 of the field device 110 to a controller (not shown). The first terminal 118 and the second terminal 120 are illustrative of screw terminal block connections, but other connections can be included as well. For example, wire 39 includes a wire splice 46 in order for the wire 39 to continue to pass through the field device 110 and to the controller. It will be appreciated that where a wire does not have sufficient length to pass to a controller, any type of wire splice can be implemented in order to allow the wire to continue through the field device and to the controller in order to provide the signal data being monitored or sensed by the field device. It will also be appreciated that some implementations may not accept a wire splice, or a dual connection on one terminal, and as such, other connections can be employed.

Figure 3:
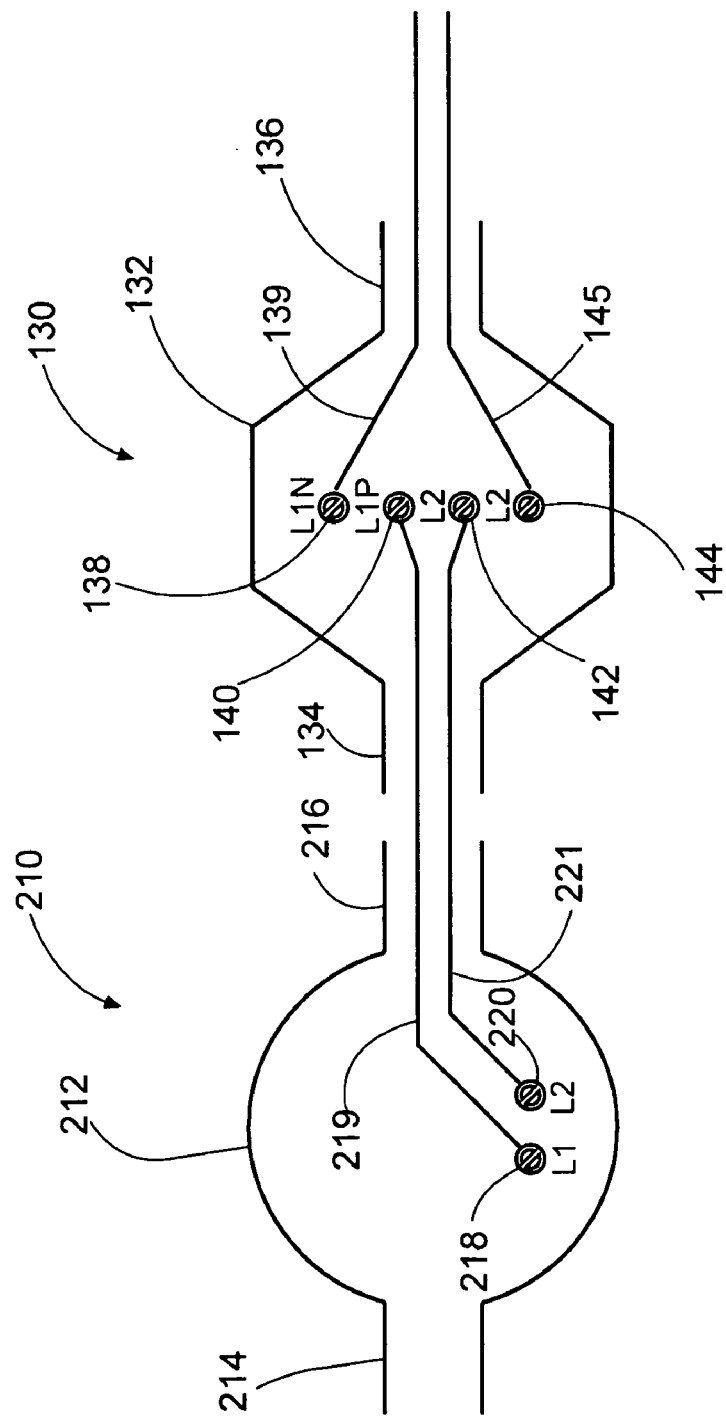
FIG. 3 illustrates another block diagram of a field device in combination with a wireless adapter within a process control system.

In an alternate embodiment, a wireless adapter 130 could be placed in-line for a process control system upstream from a field device 210, as generally illustrated in FIG. 3. The wireless adapter 130 can include a casing 132 having a first port 134 and a second port 136. The wireless adapter can have a plurality of terminals (e.g., items 138, 140, 142 and 144 in FIG. 3) having a plurality of wires (e.g., items 139 and 145 in FIG. 3) extending from the respective terminals. As shown the embodiment of FIG. 3, the first port 134 of the wireless adapter can couple to a second conduit 216 of the field device 210. It will be appreciated that various types of coupling connections could be employed and can include, for example, a substantially air-tight connection in order to prevent any potential interference of the signals being sensed or monitored by a field device. This field device 210 can include a casing 212 having two conduits (e.g., a first conduit 214 and a second conduit 216). Within the casing 212 of the field device 210, a first terminal 218 and a second terminal 220 can reside. The first terminal 218 and the second terminal 220 can include screw terminal block connections. It will be appreciated that other types of connections can be used for such terminals. Extending from the first terminal 218 can be a first wire 219. Extending from the second terminal 220 can be a second wire 221. The first wire 219 and the second wire 221 can pass through an opening in the second conduit 216 of the field device 210 and into the wireless adapter 130. The first wire 219 and the second wire 221 can terminate at one of the respective plurality of terminals (e.g., items 140 and 142 in FIG. 3) within the wireless adapter 130. An additional pair of wires (e.g., items 139 and 145 in FIG. 3) can then extend from other terminals (e.g., items 138 and 144 in FIG. 3) within the wireless adapter 130 so that these pair of wires (e.g., items 139 and 145 in FIG. 3) can be connected to a controller (not shown) of a control system. This arrangement between the field device 210 and the wireless adapter 130 provides a pass-through connection to the controller.

It is, of course, not possible to describe every conceivable combination of components or methodologies, but one of ordinary skill in the art will recognize that many further combinations and permutations are possible. In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the examples provided. In addition, while a particular feature may have been disclosed with respect to only one of several implementations, such feature may be combined with one or more other features of the other implementations as may be desired or advantageous for any given or particular application.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather, it is hereby intended the scope of the invention be defined by the claims appended hereto.

What is claimed is:

1. A process control system comprising:
    a field device comprising a first terminal, a second terminal, a first conduit and a second conduit;
    a wireless adapter comprising a first terminal, a second terminal, a first port and a second port, wherein the first conduit of the field device couples to the second port of the wireless adapter such that the wireless adapter is located at a position downstream from the field device;
    a first wire passing between the wireless adapter and the field device connecting the first terminal of the wireless adapter to the first terminal of the field device;
    a second wire passing between the wireless adapter and the field device connecting the second terminal of the wireless adapter to the second terminal of the field device;
    a process controller located at a position upstream from the field device; and
    a third wire connected to the third terminal of the wireless adapter and configured to pass to the process controller;
    wherein the wireless adapter further comprises a third terminal and a fourth terminal.

2. The process control system of claim 1, wherein the third wire comprises a wire splice permitting the third wire to pass to the process controller.

3. The process control system of claim 1, wherein the second wire connected to the second terminal of the field device is configured to pass to the process controller.

4. The process control system of claim 3, wherein the second wire and the third wire provide for communication between the process controller and field device.

5. The process control system of claim 4, wherein the communication between the process control and field device comprises at least one of an analog communication and a digital communication.

6. The process control system of claim 5, wherein the communication comprises a digital communication, wherein the digital communication uses a HART communications protocol.

7. A process control system comprising:
    a field device comprising a first terminal, a second terminal, a first conduit and a second conduit;
    a wireless adapter comprising a first terminal, a second terminal, a third terminal, a fourth terminal, a first port and a second port, wherein the second conduit of the field device couples to the first port of the wireless adapter such that the wireless adapter is located at a position upstream from the field device;
    a first wire passing between the field device and the wireless adapter connecting the first terminal of the field device to the first terminal of the wireless adapter;
    a second wire passing between the field device and the wireless adapter connecting the second terminal of the field device to the second terminal of the wireless adapter;
    a process controller located at a position upstream from the field device; and
    a third wire connected to the third terminal of the wireless adapter and configured to pass to the process controller.

8. The process control system of claim 7, wherein the system further comprises a fourth wire connected to the fourth terminal of the wireless adapter and configured to pass to the process controller.

9. The process control system of claim 8, wherein the third wire and the fourth wire provide for communication between the process controller and field device.

10. The process control system of claim 9, wherein the communication between the process control and field device comprises at least one of an analog communication and a digital communication.

11. The process control system of claim 10, wherein the communication comprises a digital communication, wherein the digital communication uses a HART communications protocol.

* * * * *